United States Patent
Eriksson et al.

(10) Patent No.: US 10,461,830 B2
(45) Date of Patent: *Oct. 29, 2019

(54) METHODS, NETWORK NODE AND COMMUNICATION DEVICE FOR TRANSMITTING DATA

(71) Applicant: Telefonaktiebolaget LM Ericsson (publ), Stockholm (SE)

(72) Inventors: Erik Eriksson, Linköping (SE); Erik Larsson, Uppsala (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,658

(22) Filed: Jul. 10, 2018

(65) Prior Publication Data

US 2018/0323847 A1 Nov. 8, 2018

Related U.S. Application Data

(63) Continuation of application No. 15/500,171, filed as application No. PCT/SE2014/051163 on Oct. 7, 2014, now Pat. No. 10,050,691.

(51) Int. Cl.
*H04B 7/06* (2006.01)
*H04L 5/00* (2006.01)
(Continued)

(52) U.S. Cl.
CPC ......... *H04B 7/0617* (2013.01); *H04B 7/0456* (2013.01); *H04B 7/0667* (2013.01);
(Continued)

(58) Field of Classification Search
CPC .. H04B 7/0617; H04B 7/0456; H04B 7/0667; H04L 5/00; H04L 25/03; H04W 72/0406
(Continued)

(56) References Cited

U.S. PATENT DOCUMENTS 10,050,691 B2   8/2018   Eriksson et al.
2009/0046582 A1 2/2009   Sarkar et al.
(Continued)

FOREIGN PATENT DOCUMENTS

KR   20110050537 A   5/2011
WO   2010025249 A1   3/2010

OTHER PUBLICATIONS

Alamouti, Siavash M., "A Simple Transmit Diversity Technique for Wireless Communications," IEEE Journal on Select Areas in Communications, vol. 16, Issue 8, Oct. 1998, IEEE, pp. 1451-1458.
(Continued)

*Primary Examiner* — Michael R Neff
(74) *Attorney, Agent, or Firm* — Withrow & Terranova, PLLC

(57) ABSTRACT

The disclosure relates to a method performed in a network node for transmitting data in a wireless network. The network node is configurable for controlling a multiple input multiple output antenna system. The method comprises beamforming user specific data streams to one or more communication devices, $UE_1, \ldots, UE_K$, wherein the beamforming is based on respective channel information available for each of the one or more communication devices, $UE_1, \ldots, UE_K$, precoding control information streams using a transmit diversity scheme; and transmitting the beamformed user specific data streams and the precoded control information streams in a same transmission resource. The disclosure relates to a network node, method in communication device, communication device and computer programs and computer program products.

18 Claims, 5 Drawing Sheets

(51) Int. Cl.
*H04L 25/03* (2006.01)
*H04B 7/0456* (2017.01)
*H04W 72/04* (2009.01)
*H04L 25/02* (2006.01)

(52) U.S. Cl.
CPC .............. *H04L 5/00* (2013.01); *H04L 5/0053* (2013.01); *H04L 25/0212* (2013.01); *H04L 25/03* (2013.01); *H04W 72/0406* (2013.01); *H04L 5/0094* (2013.01)

(58) Field of Classification Search
USPC ........................................................ 375/267
See application file for complete search history.

(56) References Cited

U.S. PATENT DOCUMENTS

| | | |
|---|---|---|
| 2009/0322613 A1 | 12/2009 | Bala et al. |
| 2013/0039284 A1 | 2/2013 | Marinier et al. |
| 2013/0121276 A1 | 5/2013 | Kim et al. |
| 2013/0242947 A1 | 9/2013 | Chen et al. |
| 2014/0286292 A1 | 9/2014 | Park |
| 2015/0029996 A1 | 1/2015 | Yuan |
| 2017/0279511 A1 | 9/2017 | Eriksson et al. |

OTHER PUBLICATIONS

Jin, Jing et al., "Effect of Imperfect Channel Estimation on Multi-user Beamforming in LTE-Advanced system," 2010 IEEE 71st Vehicular Technology Conference (VTC 2010-Spring), May 16-19, 2010, Taipei, Taiwan, IEEE, 5 pages.
Jöngren, George et al., "Combining Beamforming and Orthogonal Space-Time Block Coding," IEEE Transactions on Information Theory, vol. 48, Issue 3, Mar. 2002, IEEE, pp. 611-627.
Larsson, Erik G. et al., "Massive MIMO for Next Generation Wireless Systems," IEEE Communications Magazine, vol. 52, Issue 2, Feb. 2014, IEEE, pp. 186-195.
Marzetta, Thomas L., "Noncooperative Cellular Wireless with Unlimited Numbers of Base Station Antennas," IEEE Transactions on Wireless Communications, vol. 9, Issue 11, Nov. 2010, IEEE, pp. 3590-3600.
Motorola, "R1-074576: Support of Precoding for E-UTRA DL L1/L2 Control Channel," Third Generation Partnership Project (3GPP) TSG RAN1 Meeting #51, Nov. 5-9, 2007, 4 pages, Jeju, Korea.
Ngo, Hien Quoc et al., "Energy and Spectral Efficiency of Very Large Multiuser MIMO Systems," IEEE Transactions on Communications, vol. 61, Issue 4, Apr. 2013, IEEE, pp. 1436-1449.
Rusek, Fredrik et al., "Scaling Up MIMO: Opportunities and Challenges with Very Large Arrays," IEEE Signal Processing Magazine, vol. 30, Issue 1, Dec. 11, 20112, IEEE, pp. 40-60.
Non-Final Office Action for U.S. Appl. No. 15/500,171, dated Aug. 10, 2017, 10 pages.
Final Office Action for U.S. Appl. No. 15/500,171, dated Jan. 23, 2018, 12 pages.
Notice of Allowance for U.S. Appl. No. 15/500,171, dated Apr. 11, 2018, 9 pages.
Notice of Allowance for U.S. Appl. No. 15/500,171, dated Apr. 26, 2018, 5 pages.
Partial Supplementary European Search Report for European Patent Application No. 14903749.1, dated Sep. 27, 2017, 15 pages.
Supplementary European Search Report for European Patent Application No. 14903749.1, dated Jan. 16, 2018, 6 pages.
Examination Report for European Patent Application No. 14903749.1, dated Feb. 5, 2018, 10 pages.
First Office Action for Japanese Patent Application No. 2017-507427, dated Mar. 2, 2018, 8 pages.
Decision of Refusal for Japanese Patent Application No. 2017-507427, dated Aug. 13, 2018, 7 pages.
Notification of Reasons of Refusal for Korean Patent Application No. 10-2017-7007420, dated Jun. 19, 2018, 11 pages.
Written Opinion for Korean Patent Application No. 10-2017-7007420, dated Jul. 11, 2018, 15 pages.
International Search Report and Written Opinion for International Patent Application No. PCT/SE2014/051163, dated Jun. 26, 2015, 11 pages.
International Preliminary Report on Patentability for International Patent Application No. PCT/SE2014/051163, dated Apr. 20, 2017, 9 pages.
Fujitsu, "R1-143840: Considerations on schemes for elevation beamforming/Full-dimension MIMO for LTE," 3GPP TS RAN WG1 Meeting #78bis, Oct. 6-10, 2014, Ljubljana, Slovenia, 2 pages.
Notice of Preliminary Rejection for Korean Patent Application No. 10-2017-7007420, dated Dec. 13, 2018, 6 pages.

METHODS, NETWORK NODE AND COMMUNICATION DEVICE FOR TRANSMITTING DATA

RELATED APPLICATIONS

This application is a continuation of U.S. patent application Ser. No. 15/500,171, filed Jan. 30, 2017, now U.S. Pat. No. 10,050,691, which is a 35 U.S.C. § 371 national phase filing of International Application No. PCT/SE2014/051163, filed Oct. 7, 2014, the disclosures of which are incorporated herein by reference in their entireties.

TECHNICAL FIELD

The technology disclosed herein relates generally to the field of Multiple Input Multiple Output (MIMO) technology, and in particular to methods and nodes for transmitting data in wireless networks using a multiple input multiple output antenna system.

BACKGROUND

In Multiple Input Multiple Output (MIMO) antenna technology multiple antennas are used in order to improve communication performance, e.g. in terms of increased data rates and link ranges. By estimating channel impulse responses and beamform signals based thereon, such improvements can be accomplished without requiring additional bandwidth or increased transmission power.

Massive MIMO is an emerging technique for wireless access wherein a very large number (e.g. hundreds) of phase-coherent antenna elements are used in a radio base station for serving a relatively small number (e.g. tens) of user terminals in a communication resource, e.g. the same time-frequency resource.

A fundamental assumption in massive MIMO is that the antenna array can acquire sufficiently accurate channel state information (CSI) to the user terminals, so that coherent ("closed loop") beamforming can be applied in the downlink (link direction from the radio base station to the user terminal). It is thus assumed that the channel properties of the communication link can be acquired and there are various methods for this. For instance, for acquiring CSI for the uplink (link direction from the user terminal to the radio base station) the user terminals may be configured to transmit pilot signals, which the radio base station receives and estimates a channel response based on. Channel reciprocity may then be assumed for the downlink.

There are also various ways to perform beamforming in massive MIMO, which is briefly described next. Consider a radio base station with an antenna array with M antenna elements about to send beamformed data to K user terminals, where each user terminal comprises a single antenna. Let $g_k$ be a vector of size M that represents a channel response in a particular resource block from the antenna array to the $k^{th}$ user terminal. Then, at time t, the radio base station transmits in the downlink a linear combination of vectors as follows:

$$\sum_{k=1}^{K} v_k s_k(t) \tag{1}$$

where $\{v_k\}$ are beamforming vectors associated with the K terminals, k=1, ..., K, and $\{s_k(t)\}$ are symbols aimed at the respective K terminals at time instant t. The channel is considered constant within one resource block, and within each resource block a number T of symbols $\{s_k(1); ...; s_k(T)\}$ can be sent to each terminal k. The beamforming vectors $\{v_k\}$ are chosen as functions of the (estimated) channel responses $\{g_k\}$.

Operationally the beamforming method in Eq. (1) makes sure that power emitted by the radio base station antenna array is focused onto the geographical spots where it is known that the receiving user terminals are located. This assumes that the radio base station has had prior contact with the user terminals, and in particular, has estimated the channel responses {gk} to them, for each resource block. The term resource block here means the time-frequency space over which the channel is constant, often called "coherence interval" in the massive MIMO literature.

Before a link has been established with a user terminal, the radio base station does not know the channel response $g_k$ to the user terminal. This means that antenna array beamforming gain cannot be exploited for such user terminals. However, certain information, e.g. control information, must be sent on a periodic basis also to those user terminals to which the radio base station does not have channel state information. This kind of control information may comprise general system information that should simply be broadcast to everyone, and it may include "wake-up" (paging) messages intended to tell a particular user terminal that it should attempt to contact the radio base station on the uplink. In the present disclosure, this kind of information is denoted "control information" or "broadcast data".

When CSI is unavailable, beamforming cannot be used and space-time block coding, which does not require CSI at the transmitter, may for instance be used. Space-time block coding is a way of efficiently exploiting spatial (transmit) diversity. For two transmitter antennas, the Alamouti scheme is often used, and for more than two antennas there are many well developed schemes, for instance various space-time or space frequency coding.

Space-time block coding exploits the spatial diversity by sending multiple copies of a data stream across the various antennas, and control information transmitted using space-time block coding will therefore consume and waste a significant amount of the scarce time-frequency resources.

Further, since beamforming cannot be used, the gains of using massive MIMO cannot be exploited for the transmission of the control information.

SUMMARY

An object of the present disclosure is to solve or at least alleviate at least one of the above mentioned problems.

The object is according to a first aspect achieved by a method performed in a network node for transmitting data in a wireless network. The network node is configurable for controlling a multiple input multiple output antenna system. The method comprises beamforming user specific data streams to one or more communication devices, wherein the beamforming is based on respective channel information available for each of the one or more communication devices; precoding control information streams using a transmit diversity scheme; and transmitting the beamformed user specific data streams and the precoded control information streams in a same transmission resource.

The method enables communication resources, e.g. the time and/or frequency resources, that are needed for transmission of broadcasting of control information to be used also for transmission of beamformed user data, in particular massive MIMO beamformed user data. This enhances the system capacity by taking advantage of the many degrees of freedom in the downlink. The throughput for active users is also enhanced by improved radio resource utilization.

The object is according to a second aspect achieved by a network node for transmitting data in a wireless network. The network node is configurable for controlling a multiple input multiple output antenna system. The network node is configured to: beamform user specific data streams to one or more communication devices, wherein the beamforming is based on respective channel information available for each of the one or more communication devices; precode control information streams using a transmit diversity scheme; and transmit the beamformed user specific data streams and the precoded control information streams in a same transmission resource.

The object is according to a third aspect achieved by a computer program for a network node for transmitting data in a wireless network. The computer program comprises computer program code, which, when executed on at least one processor of the network node causes the network node to perform the method as above.

The object is according to a fourth aspect achieved by a computer program product comprising a computer program as above and a computer readable means on which the computer program is stored.

The object is according to a fifth aspect achieved by a method performed in a communication device for receiving data in a wireless network. The method comprises receiving a signal and initiating frame processing; determining whether the signal comprises user specific data; and processing the user specific data upon determining that there is user specific data in the signal, and determining whether the signal comprises control information upon determining that there is no user specific data in the signal.

The object is according to a sixth aspect achieved by a communication device for receiving data in a wireless network. The communication device is configured to: receive a signal and initiating frame processing; determine whether the signal comprises user specific data, and processing the user specific data upon determining that there is user specific data in the signal, and determining whether the signal comprises control information upon determining that there is no user specific data in the signal.

The object is according to a seventh aspect achieved by a computer program for a communication device for receiving data in a wireless network. The computer program comprises computer program code, which, when executed on at least one processor on the communication device causes the communication device to perform the method as above.

The object is according to an eight aspect achieved by a computer program product comprising a computer program as above and a computer readable means on which the computer program is stored.

The object is according to a ninth aspect achieved by a network node for transmitting data in a wireless network. The network node comprises means for beamforming user specific data streams to one or more communication devices, wherein the beamforming is based on respective channel information available for each of the one or more communication devices; means for precoding control information streams using a transmit diversity scheme; and means for transmitting the beamformed user specific data streams and the precoded control information streams in a same transmission resource.

The object is according to a tenth aspect achieved by a communication device for receiving data in a wireless network. The communication device comprises means for receiving a signal and initiating frame processing; means for determining whether the signal comprises user specific data, and means for processing the user specific data upon determining that there is user specific data in the signal, and means for determining whether the signal comprises control information upon determining that there is no user specific data in the signal.

Further features and advantages of the present disclosure will become clear upon reading the following description and the accompanying drawings.

DETAILED DESCRIPTION

Figure 1:
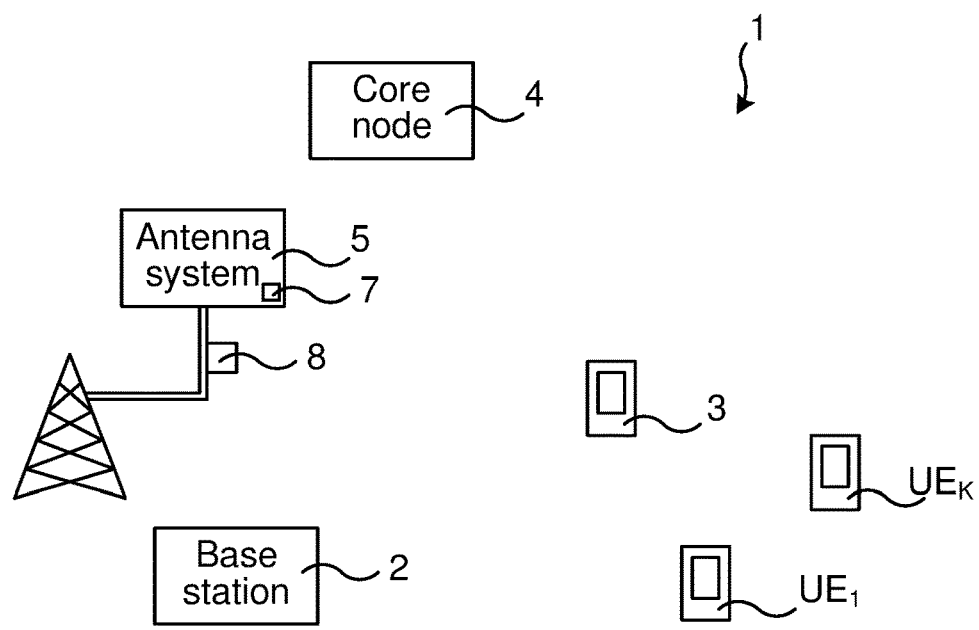
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present disclosure enables, in an aspect, a network node, e.g. a radio base station to, on the same communication resource (e.g. same time and frequency resource), transmit both user data with beamforming as well as broadcast data using a diversity scheme. In an aspect, the present disclosure further describes a communication device behavior for receiving either user data or broadcast on this single communication (time-frequency) resource.

FIG. 1 illustrates schematically an environment in which embodiments of the present disclosure may be implemented. A wireless network 1 comprises a number of network nodes 2 (only one illustrated in FIG. 1) enabling wireless communication for communication devices 3 by providing wireless links. The wireless network 1 may for instance be a 5G network ($5^{th}$ Generation wireless network) or a Long Term Evolution (LTE) network. The network nodes 2 enabling the communication devices 3 to communicate over the wireless links may be denoted in different ways, e.g. radio access node, base station, radio base station, evolved node B (eNB) etc., depending e.g. on the particular type of network. In the following the network node 2 is denoted base station 2. The base station 2 may provide coverage within a certain geographic area, denoted cell. One base station 2 may control one or more such cells.

The base station 2 comprises or controls an antenna system 5 for receiving signaling from the UEs 3 and for transmitting signaling to the UEs 3. The antenna system 5 may comprise a number of antennas 7 and receiving circuitry and transmitting circuitry 8. The base station 2 is a MIMO base station, and in particular a massive MIMO base station 2. That is, the base station 2 comprises or controls a large, or very large number of antenna arrays, e.g. hundreds of phase-coherent antenna elements. The antenna system 5 may comprise linear antenna arrays, planar antenna arrays and may comprise single polarized antenna elements or multiple polarized antenna elements. The antenna arrays may be distributed or collocated, and may be vertical, horizontal, two or three dimensional. The antenna array configuration may for instance be a rectangular, spherical or cylindrical antenna array configuration. It is thus noted that the present disclosure is not limited to any particular configuration or deployment scenario of the antenna system 5. In this context it is also noted that massive MIMO is known also as, for instance, large-scale antenna system or very large MIMO.

The communication devices 3 may be denoted in different ways, e.g. mobile station, wireless device, user equipment (UE), etc. The communication device 3 is in the following denoted user terminal or UE 3 and may comprise e.g. a smart phone, a tablet etc.

The wireless network 1 further typically comprises various other network nodes, such as Mobility Management Entity (MME), operation and maintenance (O&M) nodes, packet data network gateways, mobility management entities, serving gateways etc. One such other network node is illustrated as central network node with reference numeral 4.

Figure 2:
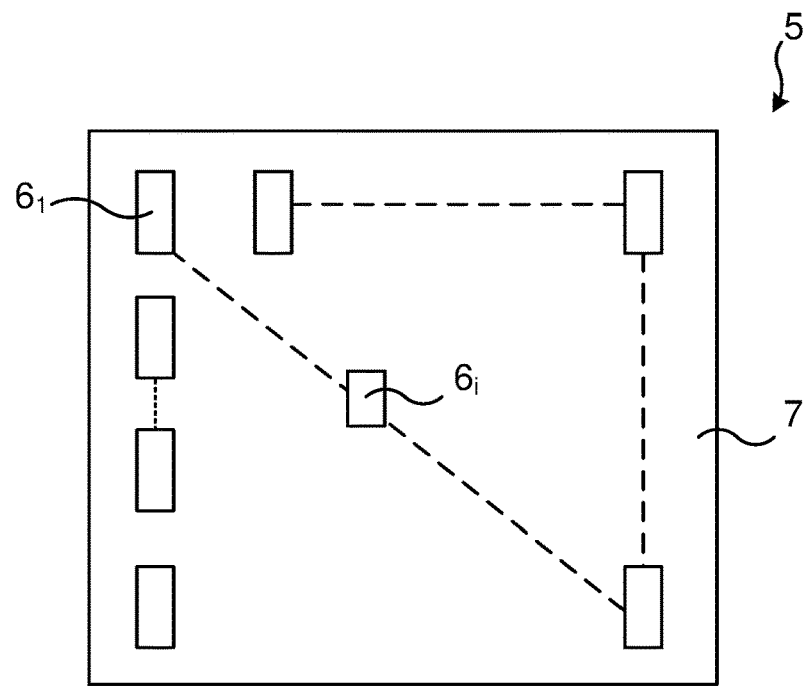
FIG. 2 illustrates schematically an exemplary antenna system.

FIG. 2 illustrates schematically an exemplary antenna system 5. The illustrated antenna system 5 comprises a planar antenna array 7 comprising a number of antenna elements $6_1, \ldots, 6_i, \ldots$. An antenna system 5 is typically intended to encompass the antenna(s) and mechanical and electrical parts (indicated schematically at reference numeral 8 in FIG. 1) needed for functioning, e.g. transmitting/receiving circuitry and components. The antenna in turn may, as mentioned, comprise a number of antenna elements. The base station 2 is configurable for using beamforming (or spatial filtering), which is a signal processing technique used in antenna arrays for directional signal transmission or reception. The antenna elements $6_1, \ldots, 6_i, \ldots$ of the antenna array 7 may be combined in a beamformer in such a way that signals at particular geographical locations experience constructive interference while others experience destructive interference. By adding the phases of the signals in a desired direction and nullifying the pattern in unwanted directions, a radiation pattern is obtained. The phase and relative amplitude of the signal at each antenna element may be controlled for creating this radiation pattern of constructive and destructive interference in a wavefront. The signal to be transmitted from each antenna element $6_1, \ldots, 6_i, \ldots$ may be multiplied with a respective beamforming weight (creating the beamforming vector) and the weighted signals are added together forming the output signal to be transmitted.

A feature of massive MIMO channel is that there is an excess of degrees of freedom in the downlink, and in particular many unused degrees of freedom in the downlink. The present disclosure discloses methods and means exploiting this fact, i.e. utilizing the many degrees of freedom in the base station that transmits control information as well as dedicated user data.

Particularly, suppose M antenna elements $6_1, \ldots, 6_M$ are used to beamform information to a number K of user terminals, $UE_1, \ldots, UE_K$, in a given time-frequency resource, i.e. a resource block. As mentioned earlier, the channel is considered constant within one resource block, and within each resource block a number of symbols can be sent to the user terminals. A resource block is intended to encompass e.g. a time-frequency resource. As a particular example, a resource block may comprise a number of subcarriers and Orthogonal frequency-division multiplexing (OFDM) symbols in an OFDM access (OFDMA) based system. A total bandwidth may comprise of a number of resource blocks, wherein a resource block is the smallest resource that can be assigned to a user terminal.

The antenna array 7 offers M degrees of freedom, but only K of them are used. Hence, M-K degrees of freedom remain unused. Usually, in the case of massive MIMO, K is much smaller than M, i.e. K<<M. In currently foreseen operating scenarios, M may for instance be equal to 100 and K be between 1 and 50, or M=500 and K between 1 and 100, although it is noted that there may be thousands of antenna elements and correspondingly also a higher number of UEs.

According to an aspect of the present disclosure, the excess degrees of freedom are exploited as follows: In each resource block, the base station 2 simultaneously (1) beamforms to a number K user terminals, $UE_1, \ldots, UE_K$, for which it has CSI, and (2) broadcasts control information aimed at all other user terminals (if any) in the cell on the unused channel degrees of freedom. The unused channel degrees of freedom may be denoted a null space (or nullspace) of the channel used for the beamforming to the K user terminals.

Generally, the null space of a linear map L: H→C between two vector spaces is the set of all elements v of H for which L(v)=0. The "null space" may be defined in a less mathematical way as the dimensions of the channel that are free, wherein "non-free" dimensions are the ones reserved for the UEs for which beamformed data is transmitted. The null space may be described as the degrees of freedom in the channel where it is essentially possible to transmit the same number of signals as degrees of freedom without causing any interference between the signals.

In the following, the user terminals to which beamforming is performed are denoted "B-terminals", and all other terminals are denoted "O-terminals". The beamforming vectors for the B-terminals are orthogonal to the null space, in which null space control information to O-terminals is broadcast. Hence, no co-channel interference exists between the terminals. However, it is noted that the present teachings is applicable also for cases wherein the beamforming vectors for the B-terminals are close to orthogonal, or essentially orthogonal, to the null space. That is, although perfectly orthogonal is a preferred scenario, other cases are also applicable. For the present disclosure, the mathematical null space may be extended to encompass cases wherein small deviations ε from zero are acceptable and within the scope of the disclosure. As long as interference caused by the deviation ε from zero is small compared to other interference and noise, ε will not substantially impact the performance.

In this manner, assuming ideal conditions (e.g. ideal channel knowledge such that the actual channel is the same as the channel used to calculate the precoding) the B-terminals will not experience any interference from the information targeting the O-terminals, and vice versa. This implies that if control information needs to be sent to a B-terminal this information needs to be communicated in-band, e.g. as a media access control (MAC)-control element. Since the broadcast information uses, in an embodiment, a diversity transmission scheme in the null space of the active B-terminals, the B-terminals are not able to decode that information in the particular resource blocks used for conveying data transmissions to the B-terminals.

In more detail, consider downlink beamforming, wherein the base station 2 transmits the M-sized vector defined in Eq. (1). The $k^{th}$ B-terminal receives $g_k$ (denoting the channel gain vector between the base station and user k) multiplied by the transmitted vector in Eq. (1), plus noise (denoted by $w_k$ here). Mathematically, the received sample $y_k(t)$ at the $k^{th}$ B-terminal at time t is $$y_k(t) = g_k^T(\Sigma_{k=1}^K v_k s_k(t)) + w_k(t) \quad (2)$$

Any part of a transmitted vector $(\Sigma_{k=1}^K v_k s_k(t))$ which falls in the null space of the following matrix:

$$G^T \triangleq [g_1, \ldots g_K]^T \quad (3)$$

will be invisible to all B-terminals. Hence, in addition to the beamformed transmission in Eq. (1), the base station 2 may send any vector, which lies in the null space of $G^T$.

According to an aspect of the present disclosure, the base station 2 sends control data in this null space of $G^T$ which control data is aimed at the O-terminals. Since the base station 2 does not $G^T$ have CSI to the O-terminals, it cannot beamform to them. However, the base station may for instance use space time block coding. Let $$Z = [z(1), \ldots z(T)]$$

be an M×T space-time block, constructed in a conventional manner (e.g. as taught in text books on space-time block coding) and which contains encoded control information. Instead of equation (1), the base station 2 then broadcasts at time t $$(\Sigma_{k=1}^K v_k s_k(t)) + (I - G^*(G^T G^*)^{-1} G^T) z(t) \quad (4)$$

the first term being the transmission to all the B-terminals, and the second term being the transmission to all O-terminals.

Since $$G^T(I - G^*(G^T G^*)^{-1} G^T) = 0,$$

none of the B-terminals will see any of the signals aimed at the O-terminals. Although the control information aimed at the O-terminals could potentially be of interest to the B-terminals as well, this information may be transmitted in a beamformed mode (i.e. in-band) to these B-terminals, exploiting the massive MIMO array gain and resulting in much better signal to noise ratio (SNR). The signal seen by the B-terminals is identical to signal according to equation (2).

The multiplication with $(I - G^*(G^T G^*)^{-1} G^T)$ has the interpretation of projecting onto the orthogonal complement of the vector space spanned by $\{g^*_k\}$. Conversely, since the beamforming of data to the B-terminals focuses the received power at the spots where the B-terminals are located, the O-terminals will see only very little interference from the beamformed transmission aimed at the B-terminals. This is true also in the case of deviating some from the exact null space, i.e. also if $G^T (I - G^*(G^T G^*)^{-1} G^T) = \varepsilon$, $\varepsilon \neq 0$.

In some embodiments of the present disclosure the UE 3 is aware of that the wireless network 1 transmits broadcast information in a specific time/frequency resource, e.g. by being configured for this, but may disregard from decoding the broadcast information if user-specific data (e.g. unicast or multicast) is received.

In some embodiments broadcast data is used to ensure coverage from the serving node, where a UE 3 may terminate the connection to a serving node if the quality of the broadcast data reaches below a threshold. In one embodiment of the present disclosure quality of broadcast information is only estimated when no user-specific data transmission is received.

Figure 3:
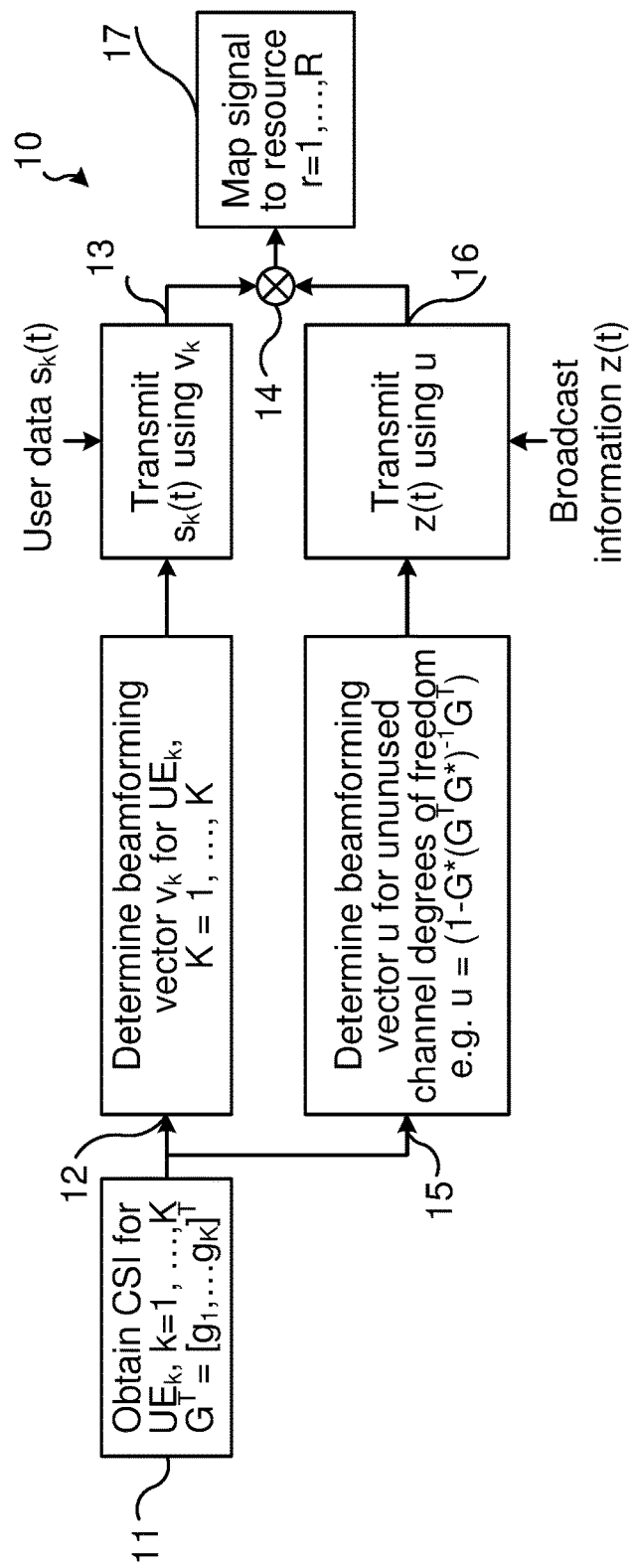
FIG. 3 illustrates processing in a network node.

FIG. 3 illustrates processing 10 in a network node, for instance a base station 2 utilizing massive MIMO technology, for implementing aspects of the present disclosure. In the below example, the term "resource" is used. The resource could for instance be a resource block as used within LTE, or some other time, frequency or code resource. It is thus noted that the way radio resources are divided into resource entities is not important for the present disclosure, and that the user specific data and the control data are transmitted in the same resource entity (as has been described), irrespective of denotation or division.

At box 11, the base station 2 obtains CSI for $UE_k$, k=1, . . . , K, of which it has knowledge about. The base station 2 may for instance be aware of a certain UE by the UE being in connected state. The base station 2 thus obtains $G^T \triangleq [g_1, \ldots g_K]^T$, wherein $g_k$ is the channel response in a particular resource from the antenna array to $UE_k$.

In box 12, the base station 2 determines the beamforming vector $v_k$ for $UE_k$, k=1, . . . , K, i.e. for all UEs for which it has CSI. For this determination, the output from box 11 is used, i.e. the beamforming vector $v_k$ may be determined based on the channel response $g_k$ (compare for instance equation 1 and related description).

In box 13 user data $s_k(t)$ is to be transmitted using the beamforming vector $v_k$. For each UE 3 for which there is user data to send, the product $v_k s_k(t)$ is determined.

The output from box 11 is input, besides to box 12, also to box 15, wherein a beamforming matrix U is determined for the unused channel degrees of freedom. For instance, U may be determined according to $U = (I - G^*(G^T G^*)^{-1} G^T)$.

In box 16 encoded control information z(t) (or broadcast information z(t)), received from an encoder, is to be transmitted using the beamforming matrix U. The product Uz(t) is determined.

The output from boxes 13 and 16, $v_k s_k(t)$ and Uz(t), respectively, is combined at indicated at reference numeral 14 and provided to box 17, for instance to a scheduler, for mapping the resulting signal e.g. to the same resource, r=1, . . . , R. In this context, it can be mentioned that a resource may be considered as a two-dimensional unit, the dimensions being frequency and time.

In e.g. LTE, a resource block is made up of one time slot in time domain and 12 sub-carriers (also denoted channels) in frequency domain, wherein a time slot is part of a so-called frame and comprises a number of symbols. Each frame may be divided into a number of sub-frames and each sub-frame is a number of time slots in the time dimension. In LTE for instance, 1 frame comprises 10 sub-frames, and a resource block spans one scheduling period, which is equal to (in time dimension) one subframe.

Figure 4:
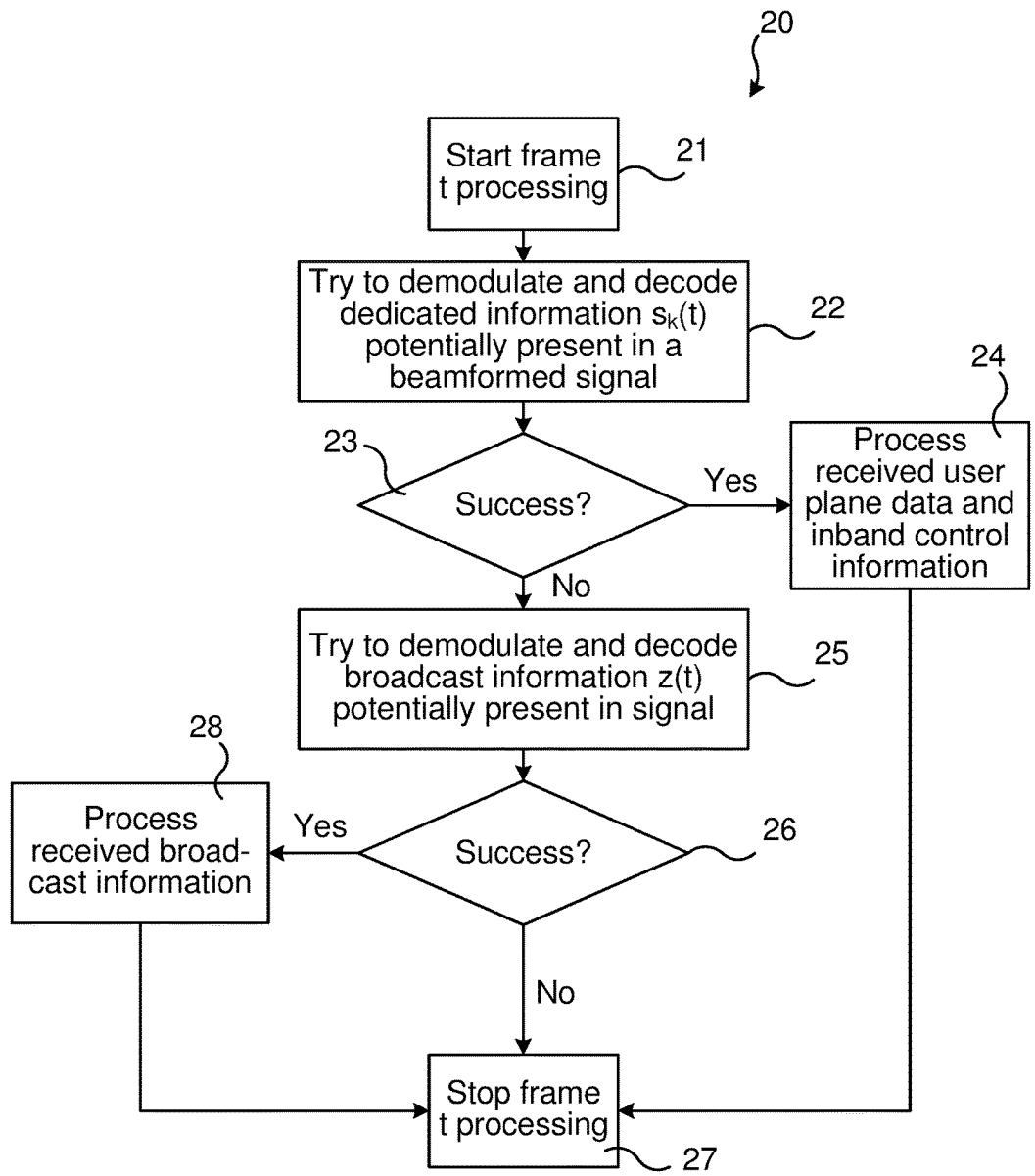
FIG. 4 illustrates a procedure in a communication device.

FIG. 4 illustrates a procedure in a user terminal according to an aspect of the present disclosure. The procedure 20 starts at box 21, wherein processing of frame t is started. The flow continues to box 22, wherein the user terminal tries to demodulate and decode dedicated information $s_k(t)$ that potentially is present in a beamformed signal.

If (box 23) the demodulation and decoding of box 22 is successful, flow continues to box 24, wherein the user terminal processes the received user plane data and any in-band control information that may be included in the signal. The flow then continues, from box 24 to box 27, wherein the processing of frame t ends.

If (box 23) the user terminal did not succeed in the demodulation and decoding of box 22, the flow continues to box 25. In box 25, the user terminal tries to demodulate and decode broadcast information z(t) that potentially is present in the signal.

If (box 26) the user terminal succeeds demodulating and decoding broadcast information z(t), then flow continues to box 28, wherein the received broadcast information is processed. The flow then continues, from box 28 to box 27, wherein the processing of frame t ends.

If (box 26) the user terminal did not succeed in the demodulation and decoding of box 25, the flow continues to box 27. In box 27, wherein the processing of frame t ends.

Figure 5:
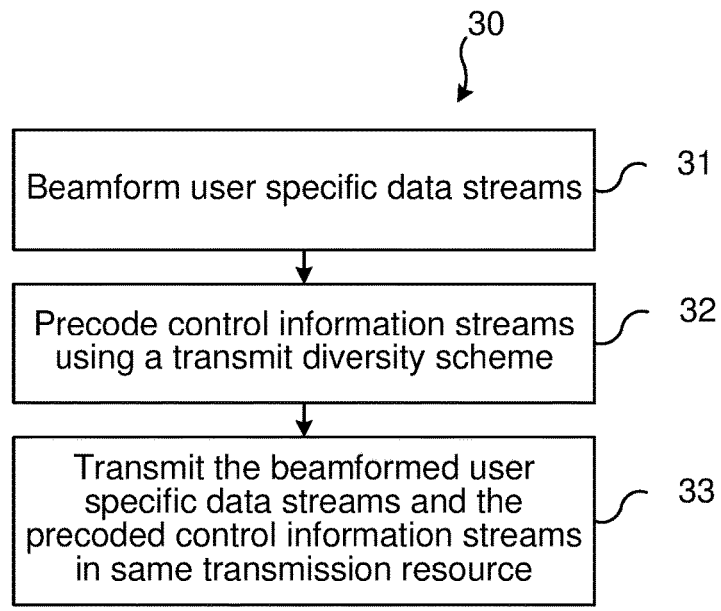
FIG. 5 illustrates a flow chart over steps of a method in a network node in accordance with an aspect of the present disclosure.

FIG. 5 illustrates a flow chart over steps of a method in a network node in accordance with the present disclosure. The various features that have been described may be combined in different ways, examples of which are described next with reference to FIG. 5.

A method 30 is provided which may be performed in a network node 2 for transmitting data in a wireless network 1. The network node 2 may for instance transmit multiple data streams. The network node 2 is configurable (or arranged) to control a multiple input multiple output antenna system 5. The network node 2 may for instance comprises a base station, a eNB etc. as has been described earlier.

The method 30 comprises beamforming 31 user specific data streams to one or more communication devices, $UE_1, \ldots, UE_K$, wherein the beamforming 31 is based on respective channel information available for each of the one or more communication devices, $UE_1, \ldots, UE_K$.

The method 30 comprises precoding 32 control information streams using a transmit diversity scheme. Such transmit diversity scheme may for instance be space-time block coding scheme (a particular example of which is Alamouti coding) or space-frequency block coding scheme.

The method 30 comprises transmitting 33 the beamformed user specific data streams and the precoded control information streams in a same transmission resource. A particular example of a transmission resource to use is a resource block.

The method 30 enables the resources (e.g. time and frequency resources) that are needed for transmission or broadcasting of control information to be used also for transmission of massive MIMO beamformed user data. The method thereby enhances the network capacity as well as the throughput for active users.

The method may be used for transmission of multiple data streams, wherein at least one stream is transmitted using a directivity format and at least one stream is transmitted using a diversity format. A directivity beamforming format may be determined for a first data stream to a first user based on channel state information knowledge. The directivity beamforming format may be determined by different known methods, e.g. Maximum ratio transmission (MRT) or zero forcing. A diversity transmission format causing limited interference to the directivity format may then be determined, e.g. by determining space time block codes (e.g. Alamouti codes) or determining space frequency block codes or using precoder cycling. The diversity transmission format determined may then be projected onto the orthogonal complement of a space spanned by channel gain vectors of the users for which the directivity beamforming is used. The first data stream is transmitted using the directivity transmission format on a first communication resource, e.g. a first time and frequency resource, and a second data stream is transmitted using the diversity transmission format on a communication resource, e.g. a time and frequency resource, at least partly overlapping with the first communication resource. Depending on how the radio resources are divided into entities (communication resources) the first and second data streams are sent entirely in the same communication resources or sent partly overlapping.

In an embodiment, the precoding 32 comprises determining a precoding matrix to be in a nullspace of a combined channel matrix comprising a respective channel matrix for each of the one or more communication devices, $UE_1, \ldots, UE_K$.

In an embodiment, the precoding 32 comprises determining a precoding matrix to be within a nullspace+ε of a combined channel matrix comprising a respective channel matrix for each of the one or more communication devices, $UE_1, \ldots, UE_K$, wherein the nullspace+£<threshold value. The threshold value may for instance be set in view of tolerable interference, which may depend on the circumstances of the particular set-up.

In an embodiment, the method 30 comprises instructing a communication device to which a beamformed user specific data stream is transmitted, on decoding of common control information. For instance, the network node may instruct the communication device to not try to decode the common control information. In particular, only when the communication device is explicitly instructed to not decode the common control channels, it may ignore to do so. To this end, the network node may for instance send information to the communication device to not decode the common control channel. This information may for instance be sent as a bit of a header of a particular message.

In a variation of the above embodiment, the instructing comprises indicating, in a bit of a control message, e.g. in a scheduling assignment or a MAC header, the communication device to decode common control information in-band.

In variations of the above two embodiments, the instructing comprises indicating in a bit of a control message the communication device to ignore common control information.

In an embodiment, the method 30 comprises, upon need to communicate control information to a communication device, $UE_1, \ldots, UE_K$, for which a user specific data stream is being beamformed, including the control information in the beamforming 31. The network node 2 may also communicate beamformed control information to the communication device for which beamformed user data is sent. Gains of massive MIMO can thereby be exploited also for the transmission of control information.

Figure 6:
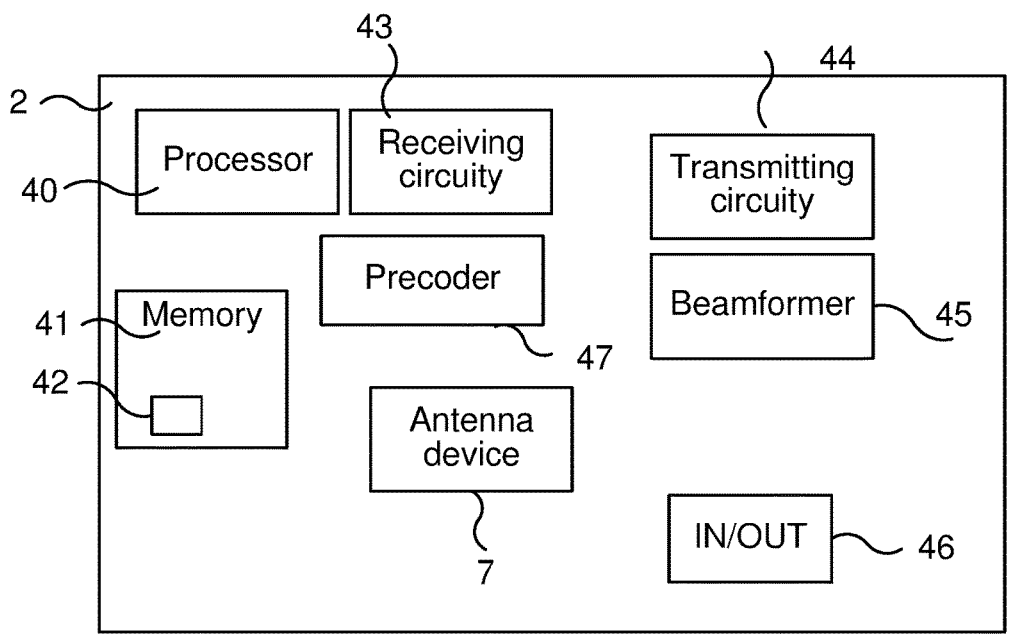
FIG. 6 illustrates schematically a network node and means for implementing methods of the present disclosure.

FIG. 6 illustrates schematically a network node and means for implementing methods of the present disclosure.

The network node 2 comprises a processor 40 comprising any combination of one or more of a central processing unit (CPU), multiprocessor, microcontroller, digital signal processor (DSP), application specific integrated circuit etc. capable of executing software instructions stored in a memory 41, which can thus be a computer program product 41. The processor 40 can be configured to execute any of the various embodiments of the method 30 as has been described for instance in relation to FIG. 5. The memory 41 can for instance be any combination of random access memory (RAM) and read only memory (ROM), Flash memory, magnetic tape, Compact Disc (CD)-ROM, digital versatile disc (DVD), Blueray disc etc. The memory 41 may also comprises persistent storage, which, for example, can be any single one or combination of magnetic memory, optical memory, solid state memory or even remotely mounted memory.

The network node 2 may comprise or be configured to control a number of antennas 7, e.g. as described with reference to FIGS. 1 and 2, for providing wireless communication to communication devices, in particular by transmitting and/or receiving signaling to/from the communication devices within its coverage area(s). The network node 2 may also comprise receiving circuitry 43 and transmitting circuitry 44 for this purpose.

The network node 2 comprises means for beamforming 45. For example, a beamformer may be implemented using software instructions such as computer program executing in a processor and/or using hardware, such as application specific integrated circuits, field programmable gate arrays, discrete logical components etc.

The network node 2 comprises means for precoding 47. The precoder may be implemented using software instructions such as computer program executing in a processor and/or using hardware, such as application specific integrated circuits, field programmable gate arrays, discrete logical components etc.

The network node 2 may comprise still other means and functions, conventionally provided in a network node, for instance an input/output device 46 (I/O or IN/OUT) constituting an interface for communication exchange with e.g. other network nodes.

A data memory (not illustrated as a separate unit) may also be provided for reading and/or storing data during execution of software instructions in the processor 40. Such data memory may for instance be any combination of random access memory (RAM) and read only memory (ROM).

A network node 2 is provided for transmitting data in a wireless network 1, wherein the network node 2 is configurable for controlling a multiple input multiple output antenna system 5. The network node 2 may be configured to control the MIMO antenna system 5 e.g. by comprising one or more processors 40 and memory, wherein the memory contains instructions executable by the processor 40, whereby the network node 2 is operative to perform e.g. the method 30 as described in various embodiments with reference to FIG. 5.

The network node 2 is configured to:
beamform user specific data streams to one or more communication devices, $UE_1, \ldots, UE_K$, wherein the beamforming is based on respective channel information available for each of the one or more communication devices, $UE_1, \ldots, UE_K$,
precode control information streams using a transmit diversity scheme, and
transmit the beamformed user specific data streams and the precoded control information streams in a same transmission resource.

In an embodiment, the network node 2 is configured to precode by determining a precoding matrix to be in a nullspace of a combined channel matrix comprising a respective channel matrix for each of the one or more communication devices, $UE_1, \ldots, UE_K$.

In an embodiment, the network node 2 is configured to precode by determining a precoding matrix to be within a nullspace+$\varepsilon$ of a combined channel matrix comprising a respective channel matrix for each of the one or more communication devices, $UE_1, \ldots, UE_K$, wherein the nullspace+$\varepsilon$<threshold value. The threshold value may have been set in view of tolerable interference, and e.g. be a preconfigured value obtainable by the network node 2.

In an embodiment, the network node 2 is configured to instruct a communication device to which a beamformed user specific data stream is transmitted, on decoding of common control information.

In an embodiment, the network node 2 is configured to instruct by indicating in a bit of a control message the communication device to decode common control information in-band.

In an embodiment, the network node 2 is configured to instruct by indicating in a bit of a control message the communication device to ignore common control information.

In an embodiment, the network node 2 is configured to, upon need to communicate control information to a communication device, $UE_1, \ldots, UE_K$, for which a user specific data stream is being beamformed, include the control information in the beamforming 31.

The present disclosure also encompasses a computer program 42 for implementing the embodiments of the method, for instance as described above. The computer program 42 may be used in the network node 2 for transmitting data, the computer program 42 comprising computer program code, which, when executed on at least one processor 40 on the network node 2 causes the network node 2 to perform the method 30 as described e.g. in relation to FIG. 5.

The present disclosure also encompasses a computer program product 41 comprising a computer program 42 as above and a computer readable means on which the computer program 42 is stored.

An example of an implementation using functions modules/software modules is also illustrated in FIG. 6, in particular illustrating the network node 2 comprising means 43, 44, 45 for implementing embodiments of the methods of the present disclosure.

The present disclosure provides, in an aspect, a network node 2 for transmitting data in a wireless network 1. The network node 2 comprises first means for beamforming user specific data streams to one or more communication devices, $UE_1, \ldots, UE_K$, wherein the beamforming is based on respective channel information available for each of the one or more communication devices, $UE_1, \ldots, UE_K$. Such first means, indicated at reference numeral 45 of FIG. 6, may (as mentioned earlier) be implemented as software instructions such as computer program executing in a processor and/or using hardware, such as application specific integrated circuits, field programmable gate arrays, discrete logical components etc. The first means 45 may comprise processing circuitry adapted to beamform by using program code stored in a memory.

The network node 2 comprises second means for precoding control information streams using a transmit diversity scheme. Such second means, indicated at reference numeral 47 of FIG. 6, may (as mentioned earlier) be implemented as software instructions such as computer program executing in a processor and/or using hardware, such as application specific integrated circuits, field programmable gate arrays, discrete logical components etc. The second means 47 may comprise processing circuitry adapted to precode by using program code stored in a memory.

The network node 2 comprises third means 44 for transmitting the beamformed user specific data streams and the precoded control information streams in a same transmission resource. The third means 44 may for instance comprise processing circuitry configured for transmitting data streams, via e.g. antenna devices.

The network node 2 may comprise still additional means for implementing the various embodiment of the present disclosure.

Figure 7:
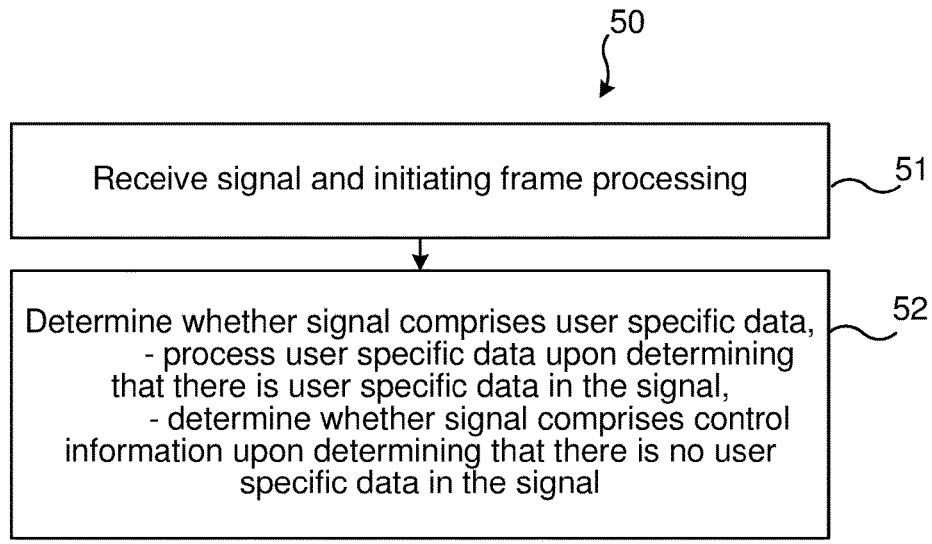
FIG. 7 illustrates a flow chart over steps of a method in a communication device in accordance with an aspect of the present disclosure.

FIG. 7 illustrates a flow chart over steps of a method in a communication device in accordance with an aspect of the present disclosure.

The method 50 is performed in a communication device 3 for receiving data in a wireless network 1.

The method 50 comprises receiving 51 a signal and initiating frame processing.

The method 50 comprises determining 52 whether the signal comprises user specific data, and processing the user specific data upon determining that there is user specific data in the signal, determining whether the signal comprises control information upon determining that there is no user specific data in the signal.

That is, if it is determined that there is user specific data in the signal, then this data is processed and any control information, that is transmitted in a communication device specific manner, that might also be present. If there is no user specific data in the signal, the communication device 3 determines whether the signal comprises control information. The procedure may for instance be implemented in a mobile station wherein the mobile station that receives a data stream with a directivity transmission format (e.g. beamformed user data) is not required to simultaneously receive and decode a second data stream with a diversity transmission format (e.g. precoded control information).

In an embodiment, the method 50 comprises, upon determining that there is control information in the signal, processing the control information and upon determining that there is no control information in the signal, ending the frame processing.

In an embodiment, wherein the communication device 3 is configured to receive control information in a control information resource, the method 50 comprises disregarding decoding data on the configured control information resource upon determining that there is user specific data in the signal.

In an embodiment, the determining 52 whether the signal comprises user specific data comprises trying to demodulate and decode user specific data from the signal.

In an embodiment, the determining presence of control information in the signal comprises trying to demodulate and decode control information from the signal.

Figure 8:
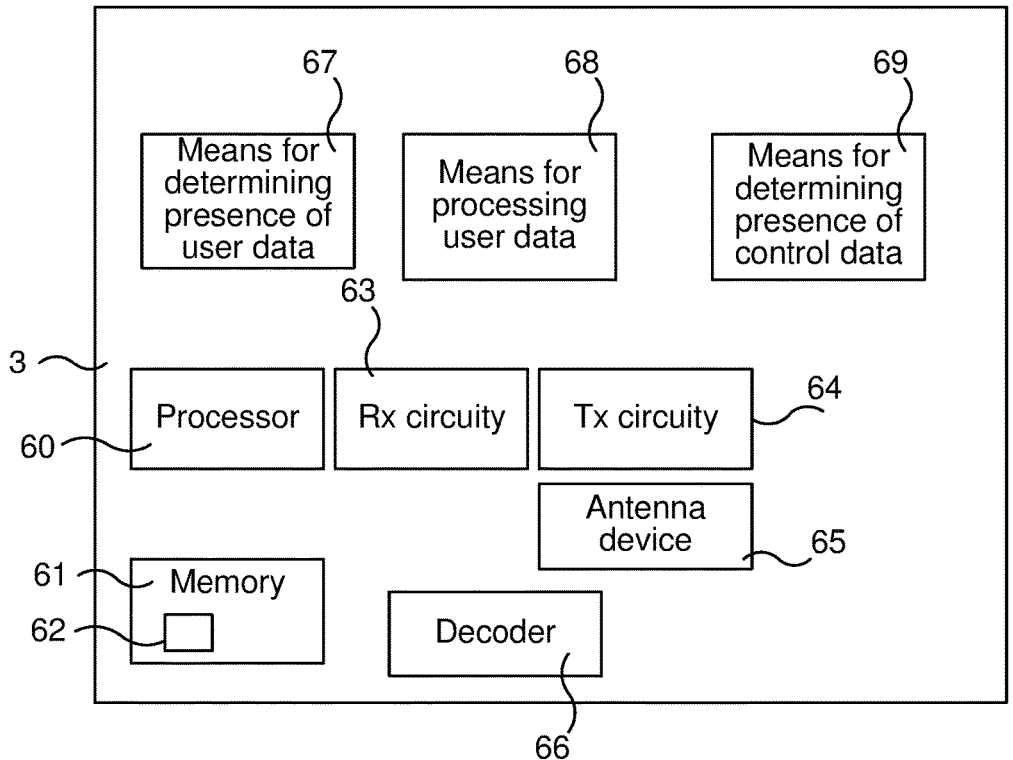
FIG. 8 illustrates schematically a communication device and means for implementing embodiments of methods of the present disclosure.

FIG. 8 illustrates schematically a communication device and means for implementing embodiments of methods of the present disclosure.

The communication device 3 comprises a processor 60 comprising any combination of one or more of a central processing unit (CPU), multiprocessor, microcontroller, digital signal processor (DSP), application specific integrated circuit etc. capable of executing software instructions stored in a memory 61, which can thus be a computer program product 61. The processor 60 can be configured to execute any of the various embodiments of the method 50 as has been described for instance in relation to FIG. 7. The memory 61 can for instance be any combination of random access memory (RAM) and read only memory (ROM), Flash memory, magnetic tape, Compact Disc (CD)-ROM, digital versatile disc (DVD), Blueray disc etc. The memory 61 may also comprises persistent storage, which, for example, can be any single one or combination of magnetic memory, optical memory, solid state memory or even remotely mounted memory.

The communication device 3 may comprise an antenna device 65 for receiving and transmitting wireless signaling from/to the network node 2. Receiving circuitry 63 and transmitting circuitry 64 may also be included for this end.

The communication device 3 may comprise still other means and functions, conventionally provided in a communication device 3, for instance decoder 66, display (not illustrated) etc. Other examples comprises means 68 for processing user data, means 67 for determining presence of user data and means 69 for determining presence of control data, all of which are described more later.

A data memory (not illustrated as a separate unit) may also be provided for reading and/or storing data during execution of software instructions in the processor 60. Such data memory may for instance be any combination of random access memory (RAM) and read only memory (ROM).

A communication device 3 is provided for receiving data in a wireless network 1. The communication device 3 is configured to perform e.g. the method 50 as described with reference to FIG. 7. The network node 2 may be configured to receive the data e.g. by comprising one or more processors 60 and memory, wherein the memory contains instructions executable by the processor 60, whereby the communication device 3 is operative to perform e.g. the method 50 as described in various embodiments with reference to FIG. 7.

The communication device 3 is configured to:

receive a signal and initiating frame processing, determine whether the signal comprises user specific data, and processing the user specific data upon determining that there is user specific data in the signal, determining whether the signal comprises control information upon determining that there is no user specific data in the signal.

In an embodiment, the communication device 3 is configured to, upon determining that there is control information in the signal, process the control information and upon determining that there is no control information in the signal, ending the frame processing.

In an embodiment, the communication device 3 is configured to receive control information in a control information resource, and to disregard decoding on the configured control information resource upon determining that there is user specific data in the signal.

In an embodiment, the communication device 3 is configured to determine whether the signal comprises user specific data by trying to demodulate and decode user specific data from the signal.

In an embodiment, the communication device 3 is configured to determine presence of control information in the signal by trying to demodulate and decode control information from the signal.

The present disclosure also encompasses a computer program 62 for implementing the embodiments of the method, for instance as described above. The computer program 62 may be used in the communication device for receiving data, the computer program 62 comprising computer program code, which, when executed on at least one processor 60 on the communication device 3 causes the communication device 3 to perform the method 50 as described e.g. in relation to FIG. 7.

The present disclosure also encompasses a computer program product 61 comprising a computer program 462 as above and a computer readable means on which the computer program 62 is stored.

An example of an implementation using functions modules/software modules is also illustrated in FIG. 8, in particular illustrating the communication device 3 comprising means for implementing embodiments of the methods of the present disclosure.

The present disclosure also provides, in an aspect, a communication device 3 for receiving data in a wireless network 1. The communication device 3 comprises first means for receiving a signal and initiating frame processing. Such first means may for instance comprise processing circuitry configured for receiving signaling, e.g. receiving circuitry 63, via antenna device 65.

The communication device 3 comprises second means for determining whether the signal comprises user specific data. Such second means may comprise processing circuitry, e.g. as indicated at reference numeral 67 of FIG. 8, adapted to perform such determination by using program code stored in a memory.

The communication device 3 comprises third means for processing the user specific data upon determining that there is user specific data in the signal. The third means may be implemented by processing circuitry, e.g. as indicated at reference numeral 68 of FIG. 8, adapted to process the user specific data by using program code stored in a memory and/or e.g. using decoding means 66.

The communication device 3 comprises fourth means for determining whether the signal comprises control information upon determining that there is no user specific data in the signal. The fourth means may be implemented by processing circuitry, e.g. as indicated at reference numeral 69 of FIG. 8, adapted to perform such determination whether there is control information in the signal by using program code stored in a memory.

The first means, the second means, the third means and the fourth means above may be implemented as software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node for transmitting data in a wireless network, the network node being configurable for controlling a multiple input multiple output antenna system, the method comprising:
   beamforming user specific data streams to one or more communication devices, $UE_1, \ldots, UE_K$, wherein the beamforming is based on respective channel information available for each of the one or more communication devices, $UE_1, \ldots, UE_K$;
   precoding information streams using a transmit diversity scheme; and
   transmitting the beamformed user specific data streams and the diversity-precoded information streams in a same transmission time and frequency resource.

2. The method as claimed in claim 1, wherein the precoding comprises determining a precoding matrix to be in a nullspace of a combined channel matrix comprising a respective channel matrix for each of the one or more communication devices, $UE_1, \ldots, UE_K$.

3. The method as claimed in claim 1, wherein the precoding comprises determining a precoding matrix to be within a nullspace+ε of a combined channel matrix comprising a respective channel matrix for each of the one or more communication devices, $UE_1, \ldots, UE_K$, wherein the nullspace+ε<threshold value.

4. The method as claimed in claim 1, comprising instructing a communication device to which a beamformed user specific data stream is transmitted, on decoding of common information.

5. The method as claimed in claim 4, wherein the instructing comprises indicating in a bit of a control message the communication device to decode common information in-band.

6. The method as claimed in claim 4, wherein the instructing comprises indicating in a bit of a control message the communication device to ignore common information.

7. The method as claimed in claim 1, comprising, upon need to communicate information to a communication device, $UE_1, \ldots, UE_K$, for which a user specific data stream is being beamformed, including the information in the beamforming.

8. A network node for transmitting data in a wireless network, the network node being configurable for controlling a multiple input multiple output antenna system, the network node comprising:
   one or more processors; and
   a memory storing instructions executable by the one or more processors, whereby the network node is operable to:
      beamform user specific data streams to one or more communication devices, $UE_1, \ldots, UE_K$, wherein the beamforming is based on respective channel information available for each of the one or more communication devices, $UE_1, \ldots, UE_K$;
      precode information streams using a transmit diversity scheme; and
      transmit the beamformed user specific data streams and the diversity-precoded information streams in a same transmission time and frequency resource.

9. The network node as claimed in claim 8, configured to precode by determining a precoding matrix to be in a nullspace of a combined channel matrix comprising a respective channel matrix for each of the one or more communication devices, $UE_1, \ldots, UE_K$.

10. The network node as claimed in claim 8, configured to precode by determining a precoding matrix to be within a nullspace+ε of a combined channel matrix comprising a respective channel matrix for each of the one or more communication devices, $UE_1, \ldots, UE_K$, wherein the nullspace+ε<threshold value.

11. The network node as claimed in claim 8, configured to instruct a communication device to which a beamformed user specific data stream is transmitted, on decoding of common information.

12. The network node as claimed in claim 11, configured to instruct by indicating in a bit of a control message the communication device to decode common information in-band.

13. The network node as claimed in claim 11, configured to instruct by indicating in a bit of a control message the communication device to ignore common information.

14. The network node as claimed in claim 8, configured to, upon need to communicate information to a communication device, $UE_1, \ldots, UE_K$, for which a user specific data stream is being beamformed, include the information in the beamforming.

15. A method performed in a communication device for receiving data in a wireless network, the method comprising:

receiving a signal and initiating frame processing;

determining, for a transmission time and frequency resource, whether the signal comprises both user specific data and diversity-precoded information in the transmission time and frequency resource;

upon determining that there is user specific data in the signal at the transmission time and frequency resource, processing the user specific data at the transmission time and frequency resource; and upon determining that there is no user specific data in the signal at the transmission time and frequency resource, determining whether the signal comprises diversity-precoded information at the transmission time and frequency resource.

16. A communication device for receiving data in a wireless network, the communication device comprising:

one or more processors; and a memory storing instructions executable by the one or more processors, whereby the network node is operable to:

receive a signal and initiating frame processing;

determine, for a transmission time and frequency resource, whether the signal comprises both user specific data and diversity-precoded information in the transmission time and frequency resource;

upon determining that there is user specific data in the signal at the transmission time and frequency resource, process the user specific data at the transmission time and frequency resource; and upon determining that there is no user specific data in the signal at the transmission time and frequency resource, determine whether the signal comprises diversity-precoded information at the transmission time and frequency resource.

17. The communication device as claimed in claim 16, configured to, upon determining that there is diversity-precoded information in the signal, process the diversity-precoded information and upon determining that there is no diversity-precoded information in the signal, ending the frame processing.

18. The communication device as claimed in claim 16, configured to receive information in an information resource, and to disregard decoding on the configured information resource upon determining that there is user specific data in the signal.

* * * * *